(12) United States Patent
Dolan

(10) Patent No.: US 8,752,852 B2
(45) Date of Patent: Jun. 17, 2014

(54) MULTI-RIDER OR OCCUPANT HUMAN POWERED VEHICLES WITH REARWARD FACING RIDER OR OCCUPANT

(71) Applicant: Martin A. Dolan, La Porte, IN (US)

(72) Inventor: Martin A. Dolan, La Porte, IN (US)

( * ) Notice: Subject to any disclaimer, the term of this patent is extended or adjusted under 35 U.S.C. 154(b) by 0 days.

(21) Appl. No.: 13/749,958

(22) Filed: Jan. 25, 2013

(65) Prior Publication Data

US 2013/0207367 A1    Aug. 15, 2013

Related U.S. Application Data

(60) Provisional application No. 61/597,412, filed on Feb. 10, 2012.

(51) Int. Cl.
    *B62M 1/02*            (2006.01)

(52) U.S. Cl.
    USPC ......... 280/231; 280/226.1; 280/241; 280/261

(58) Field of Classification Search
    USPC ............................... 280/231, 226.1, 241, 261
    See application file for complete search history.

(56) References Cited

U.S. PATENT DOCUMENTS

| | | | | | |
|---|---|---|---|---|---|
| 448,358 | A | * | 3/1891 | Moore | 280/231 |
| 568,862 | A | * | 10/1896 | Miehle | 280/231 |
| 616,481 | A | * | 12/1898 | Miehle | 280/231 |
| 647,786 | A | * | 4/1900 | Anderson | 280/231 |
| 679,283 | A | * | 7/1901 | Nichols | 280/231 |
| 4,178,008 | A | * | 12/1979 | Barrett | 280/231 |
| 4,600,206 | A | * | 7/1986 | Di Paolo | 280/231 |
| 5,314,034 | A | * | 5/1994 | Chittal | 180/21 |
| 6,012,732 | A | * | 1/2000 | Potter | 280/232 |
| 6,095,539 | A | * | 8/2000 | Graham | 280/231 |
| 6,561,594 | B1 | * | 5/2003 | Lin | 301/124.2 |
| 6,644,677 | B1 | * | 11/2003 | Rose | 280/288.1 |
| 2008/0296862 | A1 | | 12/2008 | Chen | |

* cited by examiner

*Primary Examiner* — Joseph M Rocca
*Assistant Examiner* — Marlon Arce
(74) *Attorney, Agent, or Firm* — Patzik, Frank & Samotny Ltd.

(57) ABSTRACT

A multi-rider or occupant human powered vehicle permits at least one rider or occupant to contribute to powering the vehicle while being seated in a direction opposite to the direction of travel of the vehicle. By way of example, tandem bicycles are provided accommodating rearward-facing aft cyclists or rearward-facing fore cyclists. Other vehicles, such as tricycles, four-wheeled carts, and human powered watercraft, such as paddle boats, are also contemplated by the present invention. In one embodiment, a tandem bicycle with a rearward-facing occupant contributing to powering the vehicle via a single drive chain, belt, or shaft is disclosed.

11 Claims, 5 Drawing Sheets

MULTI-RIDER OR OCCUPANT HUMAN POWERED VEHICLES WITH REARWARD FACING RIDER OR OCCUPANT

CROSS REFERENCE TO RELATED APPLICATIONS

This application claims the benefit of U.S. provisional application Ser. No. 61/597,412 filed Feb. 10, 2012, the entirety of which is hereby incorporated by reference.

BACKGROUND OF THE INVENTION

1. Field of the Invention

The present invention relates, in general, to human powered vehicles, and, more particularly, to human powered vehicles accommodating a plurality of riders or occupants.

2. General Background of the Invention

Human powered vehicles accommodating multiple riders or occupants, such as tandem bicycles, have been known for some time. In a conventional tandem bicycle, forward and rear riders, or cyclists, sit in tandem formation (i.e., fore-to-aft, rather than side-by-side). Both cyclists face in the direction of travel, and both have dedicated sets of pedals and cranksets, so that both cyclists may contribute power to the rear wheel. Moreover, in a conventional tandem bicycle, steerable handlebars are grasped by the fore cyclist and coupled to the front wheel via a rotatable fork, enabling the fore cyclist to steer the bicycle. Meanwhile, in a conventional tandem bicycle, a separate set of fixed, non-steerable handlebars may be grasped by the aft cyclist.

While tandem bicycles provide an enjoyable way for multiple cyclists to ride together as a unit, sales of tandem bicycles, to date, have been lackluster. According to statistics published by Bicycle Retailer and Industry News, sales of tandem bicycles in the United States for the year 2010 comprised less than 0.2% of the entire U.S. market for new bicycle sales. Accordingly, there appears to be a need for new ways and approaches to tandem bicycle design to enhance their popularity and to encourage additional sales of tandem bicycles.

Chen, U.S. Pub. No. 2008/0296882 A1, discloses a "multi-mode" tandem bicycle, that is reconfigurable to at least three different seating positions, including both riders facing forward, riders facing back-to-back, and both riders facing each other. Chen requires a complex drivetrain to accomplish this reconfigurable feature, including the use of multiple chains, and multiple sets of drive gears, driven gears, and idlers. Moreover, Chen further requires a complex reconfigurable steering arrangement in order to accomplish this reconfigurability. As a result, the design disclosed in Chen would appear to be relatively expensive to mass produce for broad commercial sales.

Accordingly, it is the object of the present invention to provide multi-rider or occupant human powered vehicles having a rearward facing rider or occupant.

It is another object of the present invention to provide multi-rider or occupant human powered vehicles having a rearward facing rider or occupant that requires few additional components, relative to a traditional tandem bicycle.

It is yet another object of the present invention to provide multi-rider or occupant human powered vehicles having a rearward facing rider or occupant using only a single chain.

These and other objects and features of the present invention will become apparent in view of the following specification, drawings and claims.

BRIEF SUMMARY OF THE INVENTION

The present invention comprises multi-rider or occupant human powered vehicles having a rearward facing rider or occupant. In one embodiment of the present invention, a tandem bicycle is disclosed, in which the aft cyclist faces rearward, opposite the direction of travel of the bicycle. In this embodiment, a single-drive propulsion system is disclosed, and the fore cyclist is given the ability to steer the bicycle.

In another embodiment of the present invention, another tandem bicycle is disclosed, in which the fore cyclist faces rearward, opposite the direction of travel. In this embodiment, a dual-drive propulsion system is disclosed, and the aft cyclist is given the ability to steer the vehicle.

In yet another embodiment of the present invention, a tricycle-type tandem cycle, having two steerable front wheels and a rearward facing cyclist at one of the two seating positions, is disclosed.

Other arrangements and variations are also contemplated by the present invention. For example, the human powered vehicle may also comprise, without limitation, paddle boats or other watercraft. A sidecar may optionally be added to provide additional seating for one or more passengers. Moreover, while tandem seating arrangements have been discussed above, the cyclists may, with appropriate drive gearing mechanisms, alternatively be seated side-by-side, or with one cyclist offset from the other laterally, relative to the longitudinal axis of the vehicle. In addition, three, four or even more cyclists may be accommodated, with any one or more of the cyclists being rearward facing, relative to the direction of travel of the vehicle.

DETAILED DESCRIPTION OF THE INVENTION

Figure 1:
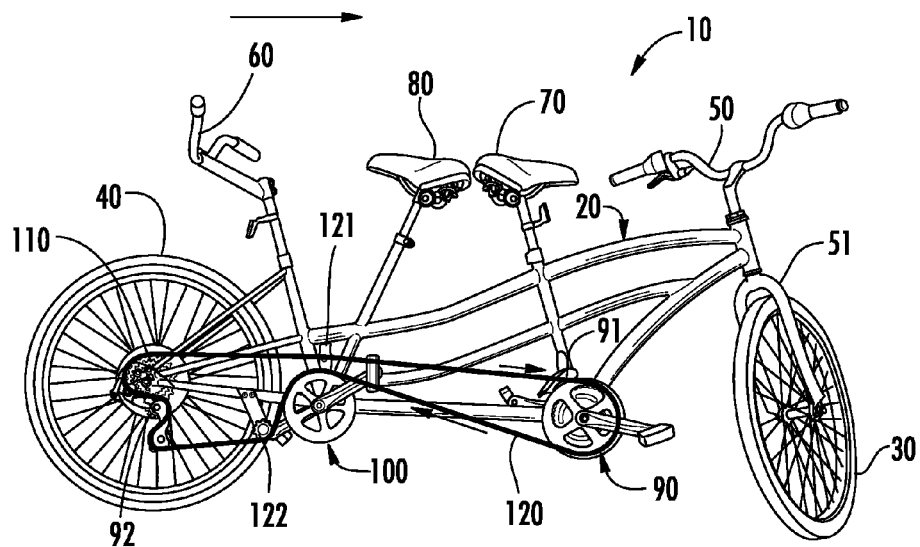
FIG. 1 is an elevated right side view of a first embodiment of the present invention.

While the present invention is susceptible of embodiment in many different forms, there is shown in the drawings and will herein be described in detail, several specific embodiments, with the understanding that the present disclosure is intended as an exemplification of the principles of the present invention and is not intended to limit the invention to the embodiments illustrated.

A first embodiment of the invention is shown in FIGS. 1, 4, 5 and 6. Referring to FIG. 1, tandem bicycle 10 is propelled by fore and aft cyclists seated upon front seat 70 and aft seat 80, respectively, and travels generally in the direction of the arrow. The fore cyclist sits upon front seat 70 facing the direction of travel of tandem bicycle 10, and steers front wheel 30 by turning front handlebars 50 which, in turn, cause front forks 51 to rotate or pivot relative to the frame of the tandem bicycle, as commanded by the fore cyclist. The aft cyclist sits upon rear seat 80 facing opposite the direction of travel of tandem bicycle 10, and grasps rear handlebars 60, which is supported by and is fixed rotationally relative to bicycle frame 20. Height and other position adjusters may optionally be provided for one or both of front handlebars 50 and rear handlebars 60.

The propulsion system for the first embodiment of the present invention includes front crankset assembly 90, front derailleur 91, rear crankset assembly 100, rear sprocket assembly 110, chain 120, first chain gear guide 121, second chain gear guide 122, and rear derailleur 92. Front crankset assembly 90 includes associated sprockets (typically two or three), cranks, arms and pedals, and is operated in the clockwise direction (as viewed from the right side of tandem bicycle 10) by the fore cyclist. Through the use of an associated lever(s) or other suitable shifting mechanism, front derailleur 91 permits one or both of the fore and aft cyclists to move chain 120 horizontally proximate front crankset assembly 90, to permit a desired sprocket of front crankset assembly 90 to engage a proximately positioned portion of chain 120.

Rear crankset assembly 100 includes an associated sprocket engaging a proximate portion of chain 120, cranks, arms and pedals, and is operated in the counterclockwise direction (as viewed from the right side of tandem bicycle 10) by the aft cyclist. Through the use of an associated lever(s) or other suitable shifting mechanism, rear derailleur 92 permits one or both of the fore and aft cyclists to move chain 120 horizontally proximate rear sprocket assembly 110 to select one of typically five to seven rear sprockets to engage chain 120. Rear sprocket assembly is fixed for rotation in the clockwise direction (when viewed from the right side of tandem bicycle 10) with rear wheel 40 to, in turn, impart rotation to rear wheel 40. In the embodiment described above, a 21-gear system is provided, with three selectable sprockets being provided in front and seven selectable sprockets being provided in the rear. More or fewer sprockets may optionally be provided with the first and/or second crankset assemblies. Alternatively, only a single front sprocket and/or a single rear sprocket may be provided, with the associated derailleur being eliminated.

Figure 5:
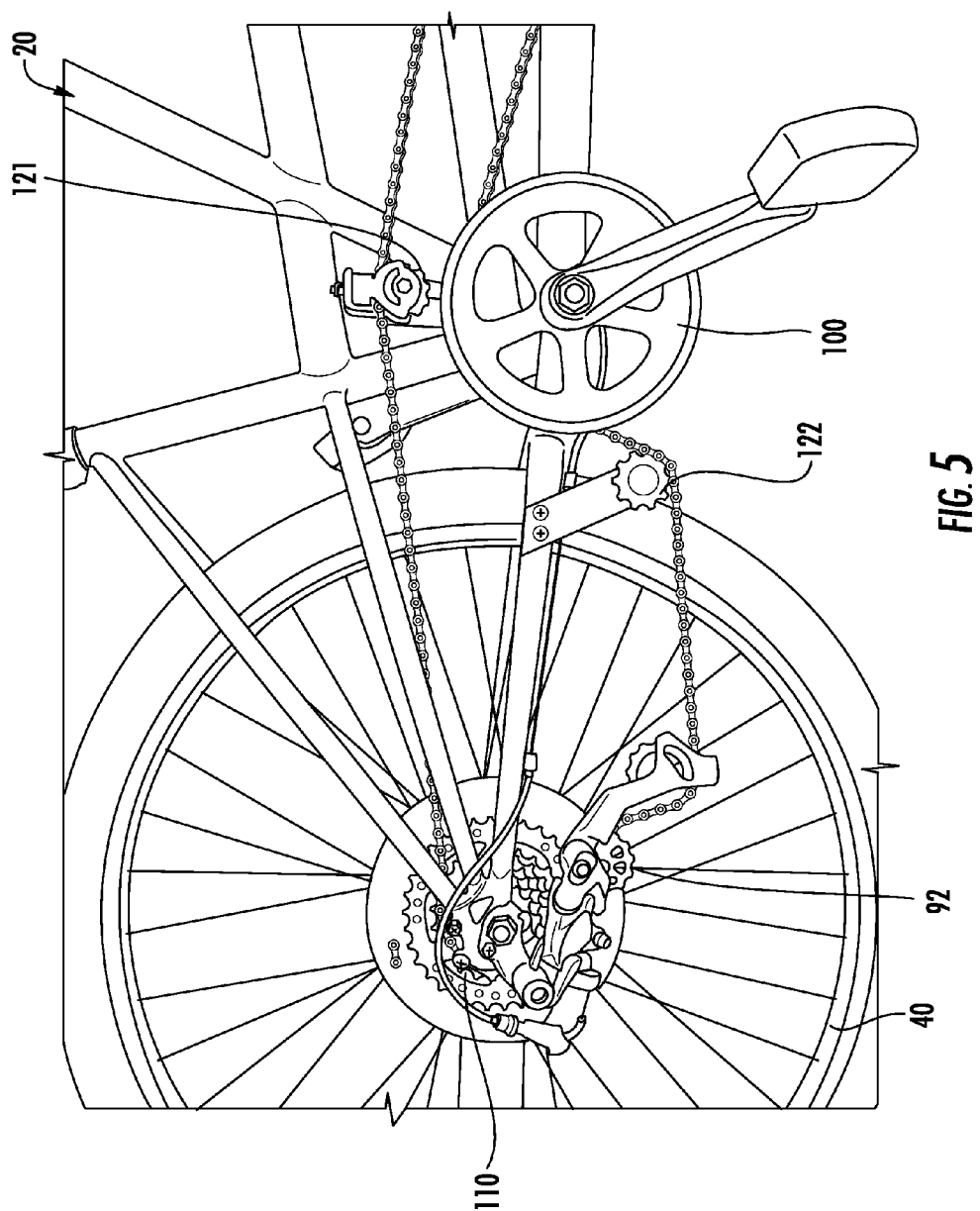
FIG. 5 is an elevated side view of a portion of the right side of the first embodiment of the present invention and showing, in particular, the rear wheel, rear wheel gear assembly, rear derailleur, second chain guide, and rear crankset assembly.
Figure 6:
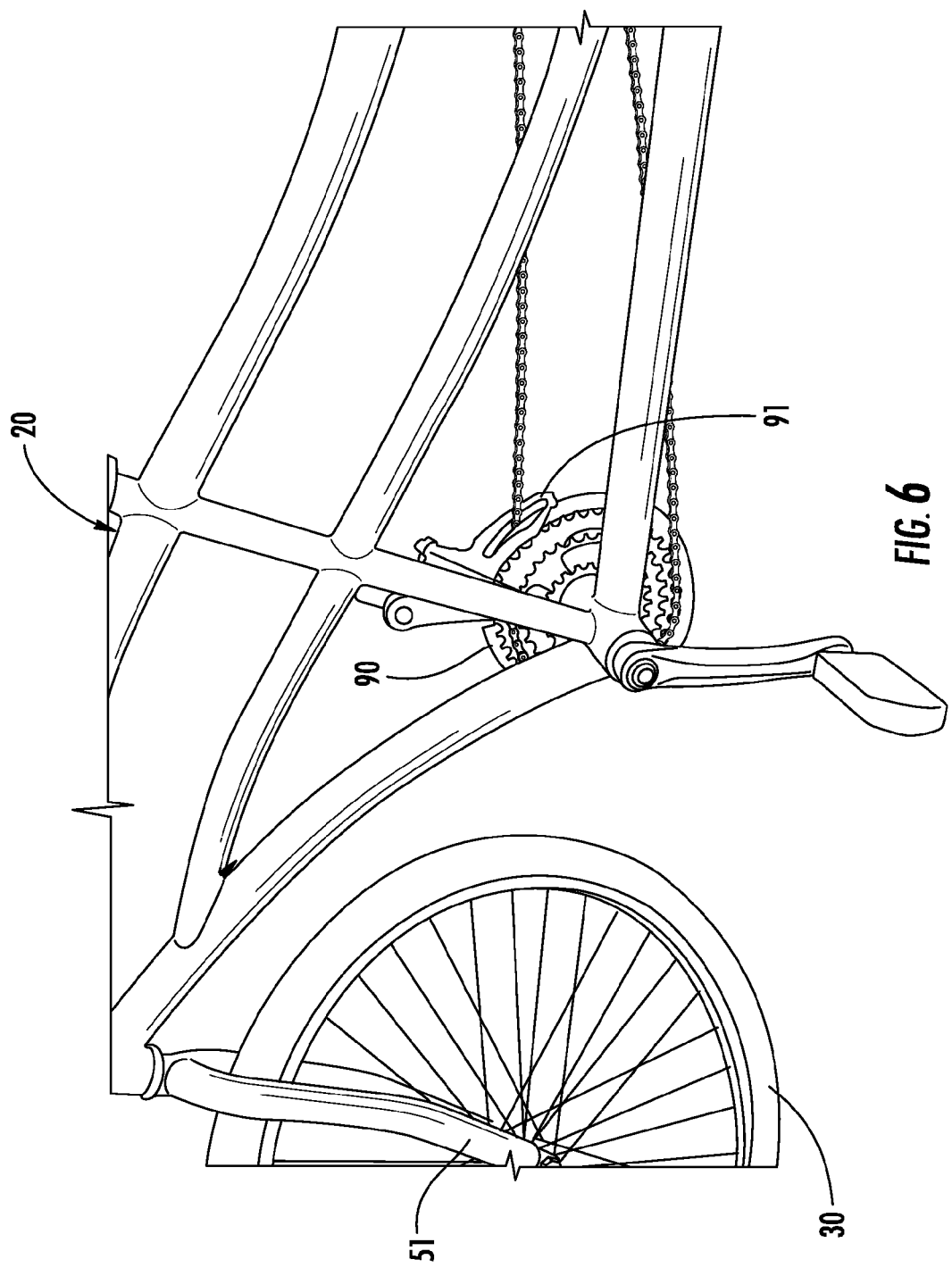
FIG. 6 is an elevated side view of another portion of the left side of the first embodiment of the present invention and showing, in particular, the front crankset assembly.

As shown by the proximate directional arrows of FIG. 1, chain 120, which serves as the sole drive chain of the first embodiment of the invention, rotates in a clockwise direction, as viewed from the right side of tandem bicycle 10, and is propelled by the combined rotational efforts of the cyclists using the pedals associated with front crankset 90 and rear crankset 100. As best seen in FIG. 5, first chain gear guide 121 comprises an idler gear that is adjustable in height through an associated bracket coupling the idler gear to frame 20. In this manner, first chain gear guide serves both to provide a desired amount of tension upon chain 120, and to provide vertical spacing of a forward-moving portion of chain 120 above rear crankset 100. As best seen in FIG. 5, second chain guide 122 comprises an idler gear that is fixed in position through an associated bracket coupling the idler gear to a chain stay portion of frame 20. Alternatively, second chain guide 122 may be made adjustable in height, with first chain guide 121 optionally being fixed in height. Second chain guide serves to maintain a portion of chain 120 in secure engagement with an upper portion of a desired sprocket of rear crankset 100 maximizing the number of sprocket teeth for the selected sprocket engaging chain 120 to, in turn, permit the aft cyclist to contribute power to the overall propulsion of tandem bicycle 10.

Figure 4:
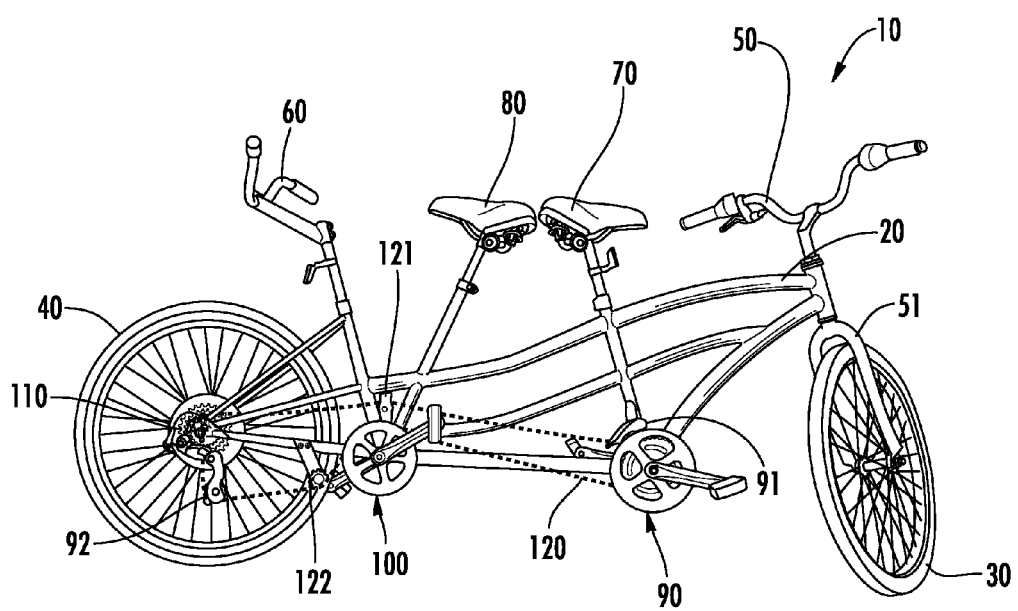
FIG. 4 is an elevated side view of the first embodiment of the invention.

As shown in FIG. 4, the first embodiment of the present invention employs a conventional braking system, with front and back actuation levers affixed to front handlebar 50, operating associated caliper-type brakes and brake pads in association with the front and rear wheels. Other known types of brake systems, such as disc or drum brakes, may alternatively be employed.

As can be seen from the foregoing, the first embodiment of the present invention provides a significantly different seating arrangement for a tandem bicycle, in that the aft cyclist, while still being able to contribute to the overall propulsion of the bicycle, is seated in a rearward facing direction, rather than a forward facing direction, as in a conventional bicycle. This, in turn, permits the two cyclists to be seated in a back-to-back fashion. As a result, an interesting initial impression may be imparted to the casual observer, who may at first perceive that the aft cyclist is attempting to pull away from or cancel out the efforts of the fore cyclist when, in fact, the two cyclists are actually acting in cooperation with each other.

Moreover, this embodiment of the invention accomplishes with few additional components, relative to a conventional tandem bicycle. Resultantly, this embodiment of the invention may be manufactured at a cost that is substantially commensurate with the cost of manufacturing a conventional tandem bicycle.

Figure 2:
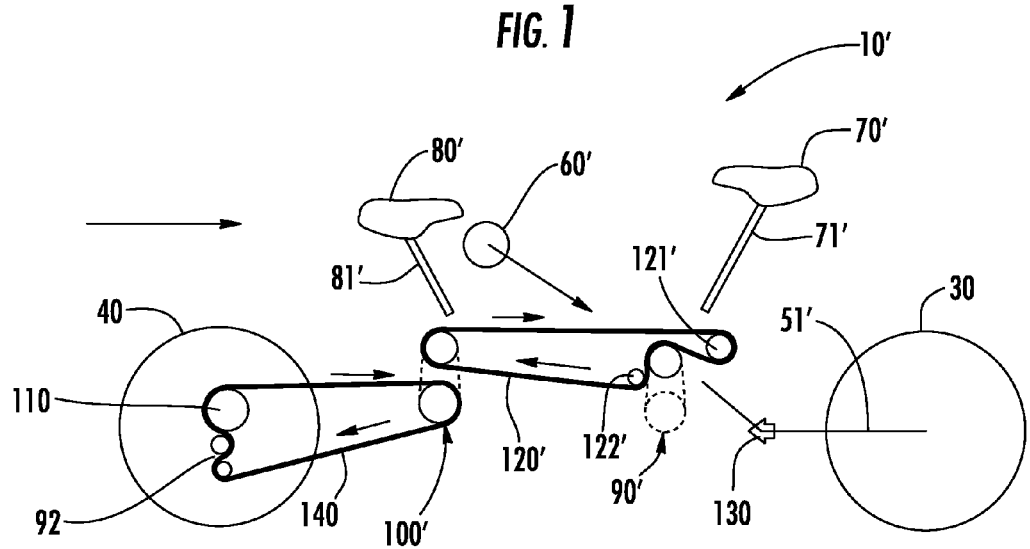
FIG. 2 is an elevated, schematic right side view of a second embodiment of the present invention.

A second embodiment of the present invention, tandem bicycle 10', is shown in FIG. 2 and is likewise propelled by fore and aft cyclists seated upon front seat 70' and aft seat 80', respectively, and travels in the direction of the arrow. In this embodiment, however, it is the fore cyclist that faces opposite the direction of travel of tandem bicycle 10', while the aft cyclist faces the direction of travel. As shown in FIG. 2, tandem bicycle 10' further comprises front wheel 30, rear wheel 40, front fork 51', rear steering wheel or handlebars 60', front seat post 71', rear seat post 81', front crankset assembly 90', rear derailleur 92, rear crankset assembly 100', rear sprocket assembly 110, first chain 120', first chain gear guide 121', second chain gear guide 122', universal joint 130, and second chain 140. Front seat post 71' and rear seat post 81' may each be adjustable in height or otherwise adjustable in position, and are each coupled to the overall frame (not shown) of tandem bicycle 10'. In this embodiment of the present invention, the aft cyclist, seated upon rear seat 80', is provided with a proximate rotatable handlebar or steering wheel 60' to permit associated rotation front wheel 30 through an appropriate mechanism or linkage, such as via universal joint 130 and front fork '51. Alternative steering linkages may alternatively be employed. A second, non-steering set of handlebars, which may be adjustable in height and other positions relative to the bicycle frame, is positioned to be readily grasped by the fore cyclist.

Front crankset assembly 90' includes one sprocket on the left side. First chain 120' couples a selected sprocket of front crankset assembly 90' to a left side sprocket of rear crankset assembly 100' to, in turn, permit the fore cyclist to transfer power from associated pedals of front crankset assembly 90' to rear crankset assembly 100'. One or both of first chain guide 121' and second chain guide 122' is preferably adjustable in position relative to the frame of tandem bicycle 10', such as via adjustable mounting brackets, to provide and maintain a desired amount of tension upon first chain 120', and to maximize the number of teeth of the selected sprocket of front crankset assembly 90' that engage first chain 120'. As shown by the proximate directional arrows of FIG. 2, first chain 120' and second chain 140 both rotate in a clockwise direction, as viewed from the right side of tandem bicycle 10'.

Unlike the rear crankset of the first embodiment of the present invention, rear crankset assembly 100' is a dual drive system and includes one or more right side sprockets with an optional associated front derailleur (not shown) similar to derailleur 91 of FIG. 1 engaging second chain 140, permitting power transmitted by first chain 120', as well as additional power supplied by the aft cyclist via pedals associated with rear crankset assembly 100', to be transferred to second chain 140. This, in turn, imparts power to rear wheel 40 through a desired sprocket of rear sprocket assembly 110, as selected through operation of rear derailleur 92.

As can be seen from the foregoing, the second embodiment of the present invention provides yet another significantly different arrangement for a tandem bicycle, in that the fore cyclist, which still being able to contribute to the overall propulsion of the bicycle, is permitted to be seated in a rearward facing direction, rather than a forward facing direction, as in a conventional bicycle. This, in turn, permits the two cyclists to be seated in a face-to-face fashion, and to continuously view each other while riding the bicycle. As a result, an interesting initial impression may initially be imparted to the casual observer that the fore cyclist is attempting to pedal into or cancel out the efforts of the aft cyclist when, in fact, the two cyclists are actually acting in cooperation with each other.

In addition to bicycles, other types of human powered vehicles accommodating multiple riders, including, but not limited to tricycles and four-wheeled vehicles, is also contemplated by the present invention. For example, referring to FIG. 3, a tricycle embodiment of the present invention may have a general configuration similar to that of tandem bicycle 10 or tandem bicycle 10', but may include dual steerable front wheel system 150 in place of front wheel 30 and front fork 51 or 51', respectively.

Figure 3:
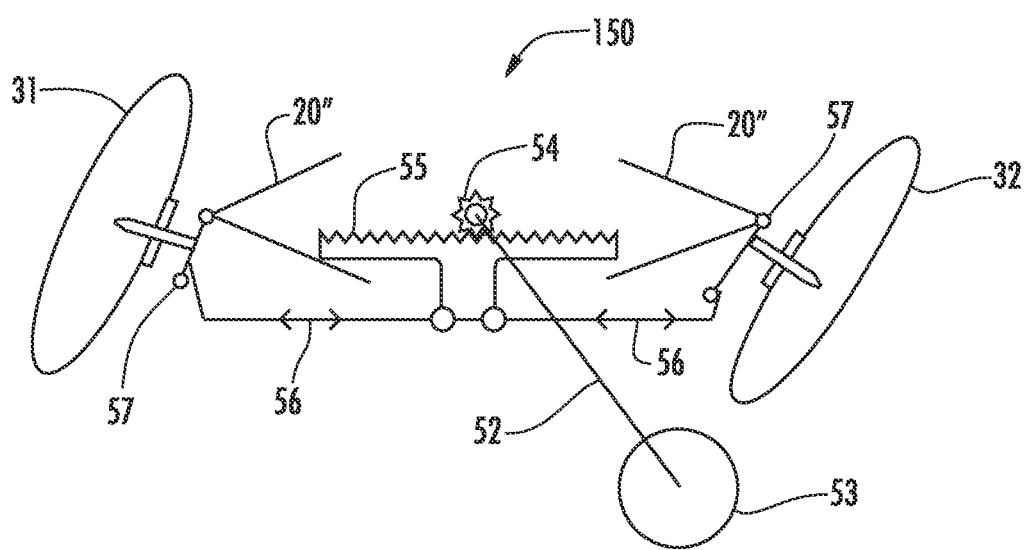
FIG. 3 is a schematic view of a portion of a two-wheeled steering portion of a third embodiment of the present invention.

As shown in FIG. 3, either the fore or aft cyclist may be provided with a proximate handlebar or steering wheel 53, having suitable grips, brake actuators, and optional gear shifters. Rotation or other movement of steering wheel 53 is imparted via steering column 52 or another suitable linkage or mechanism to correspondence clockwise or counterclockwise rotation of pinion 54. As pinion 54 includes a plurality of gear teeth engaging associated gear teeth arranges longitudinally along rack 55, rotation of pinion 54 imparts a corresponding left or right linear movement of rack 55. This, in turn, imparts corresponding angular movement of left and right spindle assemblies 57, such as via tie rod assemblies 56. In this manner, movement of steering wheel 53 imparts simultaneous corresponding rotation of front wheels 31 and 32, disposed in a parallel arrangement on opposing sides of frame 20". Other dual-wheel steering mechanisms are likewise contemplated by the present invention.

Of course, other conventional vehicle components may optionally be substituted or used in addition to those described above. For example, belt drive or shaft drive systems, rather than chain guide systems, may alternatively be employed. Other arrangements and variations are also contemplated by the present invention. For example, a human powered vehicle of the present invention may also comprise, without limitation, paddle boats or other watercraft. A sidecar may optionally be added to provide additional seating for one or more passengers. Moreover, while tandem seating arrangements have been discussed above, the cyclists may, with appropriate drive gearing mechanisms, alternatively be seated side-by-side, or with one cyclist offset from the other laterally, relative to the longitudinal axis of the vehicle. In addition, three, four or even more cyclists may be accommodated, with any one or more of the cyclists being rearward facing, relative to the direction of travel of the vehicle.

Many modifications and variations of the present invention are possible in light of the above teachings. It is therefore to be understood that within the scope of the appended claims, the invention may be practiced other than as specifically described. Various modifications, changes and variations may be made in the arrangement, operation and details of construction of the invention disclosed herein without departing from the spirit and scope of the invention. The present disclosure is intended to exemplify and not limit the invention.

What is claimed is:

1. A human powered vehicle accommodating at least one rearward facing rider or occupant relative to a direction of motion of the vehicle, the at least one rearward facing rider or occupant contributing to the propulsion of the vehicle, wherein the vehicle has a drive train comprising no more than one chain, belt or shaft, the drivetrain further comprising:
   a first drive gear at a first position accommodating a forward facing rider and operable by the forward facing rider, the first drive gear engaging the chain, belt or shaft and rotating in a first direction when propelling the vehicle in the direction of motion of the vehicle; and
   a second drive gear at a second position accommodating a rearward facing rider and operable by the rearward facing rider, the second drive gear engaging the chain, belt or shaft and rotating in a second, counter-rotating direction relative to the first drive gear when propelling the vehicle in the direction of motion of the vehicle.

2. The invention according to claim 1, wherein the no more than one chain, belt or shaft comprises a chain.

3. The invention according to claim 1, wherein at least two riders or occupants are accommodated by the vehicle.

4. The invention according to claim 3, wherein both of the at least two riders or occupants contributes to the propulsion of the vehicle.

5. The invention according to claim 1, wherein at least two riders are accommodated, with an aft rider facing opposite a direction of travel of the vehicle.

6. The invention according to claim 1, wherein at least two riders are accommodated, with a fore rider facing opposite a direction of travel of the vehicle.

7. The invention according to claim 1, wherein at least two riders are accommodated, seated face-to-face in a tandem arrangement.

8. The invention according to claim 1, wherein the vehicle is a tandem bicycle.

9. The invention according to claim 1, wherein the no more than one chain, belt or shaft comprises a chain or a belt forming a continuous loop and propelling the vehicle, the continuous loop having a first segment moving in the direction of motion of the vehicle when propelling the vehicle and a second segment moving opposite the direction of motion of the vehicle when propelling the vehicle, wherein only one of the first segment and the second segment of the continuous loop are engaged by the second drive gear.

10. The invention according to claim 9, wherein only the second segment of the continuous loop is engaged by the second drive gear.

11. The invention according to claim 1, wherein the no more than one chain, belt or shaft comprises a chain or a belt forming a continuous loop and propelling the vehicle, the continuous loop having a first segment moving in the direction of motion of the vehicle when propelling the vehicle and a second segment moving opposite the direction of motion of the vehicle when propelling the vehicle, wherein both the first segment and the second segment of the continuous loop pass the second drive gear at a position above the second drive gear when propelling the vehicle.

* * * * *